United States Patent [19]

Maguran et al.

[11] Patent Number: 4,902,034
[45] Date of Patent: Feb. 20, 1990

[54] ELECTRICALLY CONTROLLED SHOCK ABSORBER

[75] Inventors: Gene A. Maguran, West Bloomfield; Kenneth R. Meloche, Sterling Heights, both of Mich.

[73] Assignee: General Motors Corporation, Detroit, Mich.

[21] Appl. No.: 296,870

[22] Filed: Jan. 13, 1989

Related U.S. Application Data

[63] Continuation of Ser. No. 240,281, Sep. 6, 1988, abandoned.

[51] Int. Cl.$^4$ .............................................. B60G 17/00
[52] U.S. Cl. ...................................... 280/707; 188/299
[58] Field of Search .......................... 280/707; 180/299

[56] References Cited

U.S. PATENT DOCUMENTS

| | | | |
|---|---|---|---|
| 3,125,186 | 3/1964 | Day | 188/88 |
| 3,610,611 | 10/1971 | Elliott | 280/707 |
| 3,807,678 | 4/1974 | Karnopp et al. | 267/126 |
| 4,030,580 | 6/1977 | Glaze | 188/299 |
| 4,511,022 | 4/1985 | Thomas et al. | 188/299 |
| 4,589,528 | 5/1920 | Axthammer et al. | 188/279 |
| 4,597,411 | 7/1986 | Lizell | 137/516 |
| 4,650,042 | 3/1987 | Knecht et al. | 188/299 |
| 4,655,440 | 4/1987 | Eckart | 267/64.11 |
| 4,660,686 | 4/1987 | Munning et al. | 188/280 |
| 4,673,067 | 6/1987 | Munning et al. | 188/299 |
| 4,682,675 | 7/1987 | Eddy, Jr. | 188/299 |
| 4,696,379 | 9/1987 | Yamamoto et al. | 188/299 |
| 4,702,490 | 10/1987 | Yamaguchi et al. | 280/707 |
| 4,720,085 | 1/1988 | Shinbori et al. | 280/707 |
| 4,732,408 | 3/1988 | Ohlin | 280/707 |
| 4,756,393 | 7/1988 | Collee et al. | 280/707 |
| 4,773,671 | 9/1988 | Inagaki | 280/707 |
| 4,776,437 | 10/1988 | Ishibashi et al. | 280/707 |

Primary Examiner—Richard A. Bertsch
Attorney, Agent, or Firm—Robert M. Sigler

[57] ABSTRACT

An electrically controlled shock absorber includes a pumping unit which provides unidirectional fluid flow through an electrically controlled valve apparatus. The electrically controlled valve apparatus is contained in a housing external to the pumping unit in a housing defining an inlet chamber and a control chamber. A horizontally reciprocable inlet valve member controls fluid flow from the pumping unit into the inlet chamber, from which it can flow unimpeded to a reservoir chamber. The inlet valve member has an inlet orifice therethrough to allow fluid flow into the control chamber, create a pressure drop across the inlet valve member effective to cancel a constant closing bias thereon, and damp inlet valve member movement. An electromagnetically controlled pilot valve in an outlet from the control chamber to the reservoir chamber produces a control pressure in the control chamber as a function of an input electric current. The inlet valve opens as necessary to ensure that the pressure of the fluid pumped out of the pumping unit substantially equals the control pressure. The damping force is thus a function of input current independent of fluid flow rate. The pilot valve is designed for stable operation.

1 Claim, 2 Drawing Sheets

ELECTRICALLY CONTROLLED SHOCK ABSORBER

This is a continuation of U.S. Ser. No. 240,281, filed Sept. 6, 1988 by the same inventors assigned to the same assignee as this application, now abandoned.

BACKGROUND OF THE INVENTION

This invention relates to shock absorber apparatus for a motor vehicle, and particularly to fast shock apparatus in which the damping force is electrically controllable continuously in real time for a semi-active ride control.

The prior art shows many controllable shock absorbers of the type having an electric solenoid or motor driven member for selecting different orifices or blow-off valves for different damping characteristics. However, these devices have small electric actuators due to the limited space in the unit and high friction due to the manner in which the movable member is moved. Both factors limit the speed of response, so that they are not real time devices. That is, a particular shock absorber setting, once chosen, cannot be changed to respond to the next individual suspension movement that occurs. In addition, such device are not continuously variable, but rather select from several discrete settings. Such device are typically used in systems that select the setting for a particular predefined type of road surface or type of driving. This invention is different from the above described devices in that it is capable of real time damping changes through a continuous range in response to an electrical current input signal, so that each suspension movement, as it is sensed, can be damped as it occurs.

In addition, there are also shown in the prior art some shock absorbing devices in which an electromagnetically actuated valve member is placed directly in the shock fluid flow path for real time damping force variation. However, these devices, as shown, are generally inappropriate for mass production and use on four wheeled passenger and commercial motor vehicles. Some attempt to put the control valves in the shock tube itself; but this leads to necessarily small valves and passages with high resulting internal pressures on the order of thousands of psi. Some how the control valve apparatus as vertical, in which case the valve will be affected by the high G acceleration forces encountered in suspension movements. Some show inadequate regard for valve stability, which leads to possible poor control. The apparatus of this invention is a significant improvement over the device of the prior art.

SUMMARY OF THE INVENTION

The shock absorber apparatus of this invention comprises shock members attached to sprung and unsprung masses of the motor vehicle and relatively vertically movable. The shock members comprise pumping chambers containing an incompressible fluid, a piston movable to vary the volume of the pumping chambers and thereby pump the incompressive fluid with relative movement of the shock members, check valve apparatus effective to direct the pumped incompressible fluid in a single direction through a passage to a reservoir chamber regardless of direction of movement of the shock members, and an electrically controlled valve apparatus controlling flow through the passage.

The electrically controlled valve apparatus comprises a valve housing fixed externally to one of the shock members, the valve housing defining an inlet chamber and a control chamber, a horizontal inlet valve opening to the inlet chamber from the pumping chambers with a surrounding face valve seat within the inlet chamber, a horizontal outlet valve opening from the control chamber to the reservoir chamber with a surrounding face valve seat outside the control chamber, an outlet from the inlet chamber open to the reservoir chamber, and an opening from the inlet chamber to the control chamber.

The electrically controlled valve further comprises an inlet valve member with an inlet orifice therethrough in the inlet chamber horizontally reciprocable between closed and open position with respect to the face valve seat of the inlet valve opening but closing the opening from the inlet chamber to the control chamber except for the inlet orifice. The inlet valve member is biased toward its closed position by bias apparatus providing an essentially constant bias independent of the position of the inlet valve member. The inlet orifice provides fluid flow into the control chamber with relative movement of the shock members regardless of the position of the inlet valve member and a resulting pressure drop across the inlet valve member with the fluid flow therethrough effective to substantially cancel the bias of the bias apparatus so that opening of the inlet valve is controlled by the pressure in the control chamber. The orifice further provides damping for the inlet valve member.

The electrically controlled valve further comprises a pilot valve member outside the control chamber horizontally reciprocable between closed and open positions with respect to the face valve seat of the outlet valve opening. The pilot valve member is activated by an electromechanical actuator providing a valve closing force with an electric input current which opposes the hydraulic force of fluid flow out of the control chamber. A valve closing force due to any given electric input current varies less with variations in opening displacement or fluid flow therethrough than corresponding variations in the hydraulic force due to the fluid flow pressure drop across the outlet valve opening so as to produce stable pilot valve member operation with a fluid pressure within the control chamber as a function of electric input current.

When shock operation produces fluid flow through the device, the flow through the inlet valve orifice produces a constant fluid pressure drop which cancels the constant bias force resisting opening of the inlet valve and also provides the fluid flow necessary for pilot valve operation. Therefore, the control chamber pressure accurately controls the damping force of the shock by allowing opening of the inlet valve whenever the pressure of the pumped fluid exceeds that in the control chamber but closing the inlet valve when the pressure of the pumped fluid drops back to the control pressure. The result is that the damping force of the shock absorber is continuously controlled by the fluid pressure in the control chamber and therefore by the electric input current independently of the rate of fluid flow from the shock members.

Many structural characteristics of the apparatus contribute to the accurate operation as described. The external valve body allows large fluid flow passages for much smaller internal pressures in shock operation than for constructions in which the valve apparatus is contained within the shock tube. The horizontal inlet and pilot valves are not affected by vertical high G forces generated in shock operation and allow accurate and stable operation at the low internal pressures. The characteristics of the electromechanical actuator enhance stable pilot valve operation by maintaining the pilot valve member at the proper force against fluid flow after disturbances due to variations in valve position or fluid flow. The orifice through the inlet valve member produces one less possible leakage path than an orifice around the inlet valve and further damps the inlet valve to further promote stable operation. The face valves reduce friction for accurate valve operation.

DESCRIPTION OF THE PREFERRED EMBODIMENT

Figure 1:
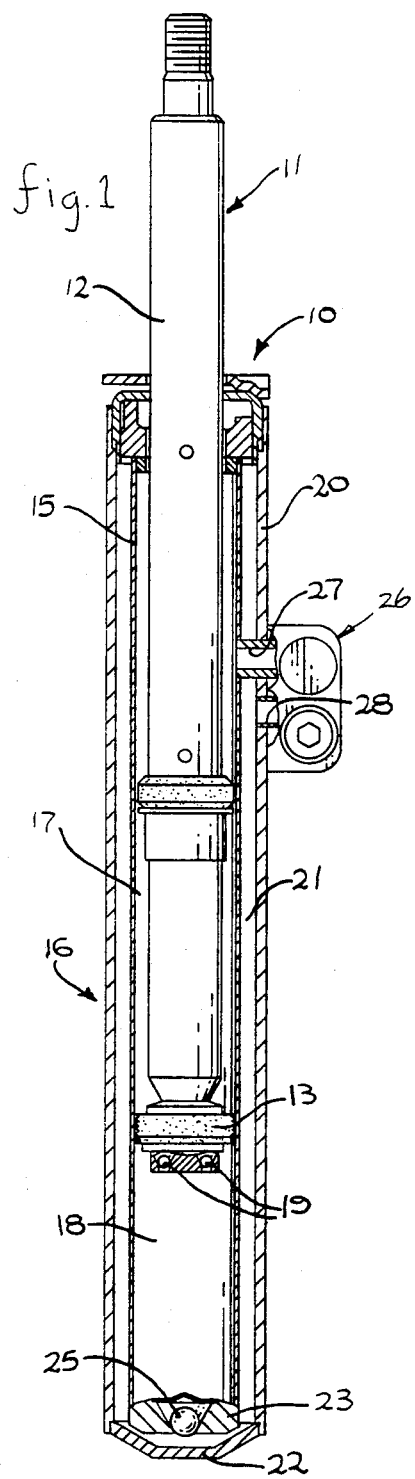
FIG. 1 is a partial cutaway view of a shock absorber apparatus according to the invention.

Referring to FIG. 1, a shock absorber 10 comprises a first shock member 11 comprising a rod 12 with an enlarged diameter piston 13 within a cylinder tube 15 which is part of a shock member 16. Piston 13 is sealingly but slidably engaged with the inner surface of cylinder tube 15 so as to divide it into a first pumping chamber 17 above piston 13 and a second pumping chamber 18 below piston 13. Chambers 17 and 18 are filled with an incompressible fluid; and piston 13 includes one way check valves 19 which allow fluid flow from chamber 18 upward to chamber 17 as piston 13 moves downward but no flow from chamber 17 downward to chamber 18 as piston 13 moves upward.

Shock member 16 further comprises a reservoir tube 20 which surrounds cylinder tube 15 coaxially and defines, with cylinder tube 15, a reservoir chamber 21, which is partially filled with the incompressible fluid. Reservoir chamber 21 extends across the bottom of the unit between a lower end cap 22 which closes reservoir tube 20 and a base valve assembly 23 which closes cylinder tube 15 and include a one way check valve 25 which allows fluid flow from reservoir chamber 21 into chamber 18 but not vice versa. An electrically controlled valve 26 allows and controls fluid flow from chamber 17 through a passage 27, valve 26 and a passage 28 to reservoir chamber 21.

One of shock members 11 and 16 is attached to the sprung mass of a motor vehicle; and the other is attached to an unsprung mass of the vehicle in a standard suspension damping arrangement, wherein the shock members 11 and 16 are relatively vertically movable as the vehicle sprung and unsprung masses move relatively vertically in vehicle suspension movement. This relative vertical movement causes piston 13 to be driven up and down within cylinder tube 15 and pump fluid through the apparatus. When piston 13 moves upward in cylinder tube 15, the volume of chamber 17 decreases. Since fluid cannot escape from chamber 17 through check valves 19 to chamber 18, it is pumped through passage 27, electrically controlled valve 26 and passage 28 to reservoir chamber 21. Check valve 25 allows fluid from reservoir chamber 25 to fill the expanding volume of chamber 18. When piston 13 moves downward in cylinder tube 15, the volume of chamber 18 decreases, but fluid is prevented by check valve 25 from entering reservoir chamber from chamber 18. The displaced fluid must therefore enter chamber 17 from chamber 18 through check valves 19. However, the volume of chamber 17 increases at a slower rate than that of chamber 18 decreases, due to rod 12 within chamber 17. Therefore, the excess fluid is pumped from chamber 17 through passage 27, electrically controlled valve 26 and passage 28. Therefore, there is a one way pumping of fluid from chamber 17 through passage 27, electrically controlled valve 26 and passage 28 with each relative vertical movement of shock members 11 and 16 regardless of the direction of that movement. Such structure and action is not new in the prior art, per se; but it plays an important role as an environment for the apparatus of this invention, since electrically controlled valve 26 need only handle fluid flow in a single direction.

Figure 3:
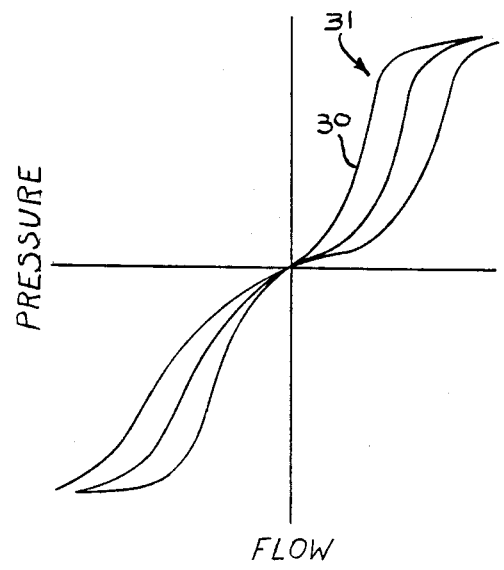
FIG. 3 is a set of pressure/flow curves for a typical passive mechanical shock absorber.
Figure 4:
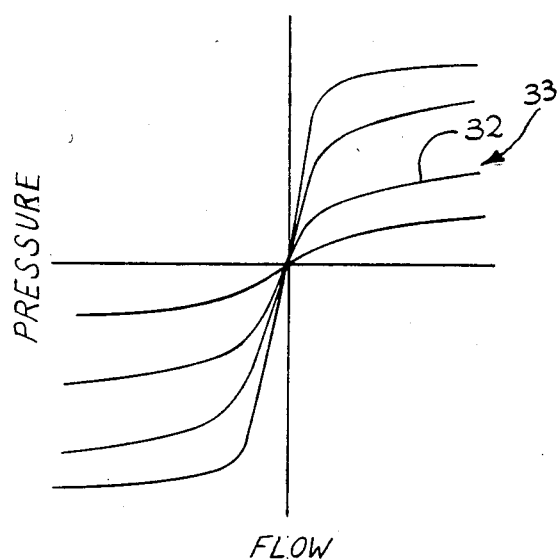
FIG. 4 is a set of pressure/flow curves for the shock absorber of the invention.

The desired action of the apparatus of this invention compared with that of the prior art may be seen with reference to the curves of FIGS. 3 and 4. FIG. 3 shows a typical set of pressure/flow curves for a standard passive mechanical shock absorber. Each curve results from a different orifice size; and a slow acting adjustable shock of the type described above may switch from one curve to the next by rotating a plate with a plurality of orifices. Each curve provides a pressure which varies with flow and thus provides a particular damping characteristic, as shown in, for example, the portion 30 of curve 31.

FIG. 4 is a set of pressure/flow curves for the apparatus of this invention. The key property of these curves is that, on any given curve, pressure is substantially independent of flow once a small minimum flow rate is exceeded, as shown in, for example, the nearly flat portion 32 of curve 33. As will be seen in the following description, each curve results from a particular input electric current. Therefore, the pressure is substantially independent of fluid flow rate and depends only on the input current level. The apparatus is designed so that the pressure is exerted directly on the pumped fluid so as to oppose fluid flow and thus generate a damping force; and the apparatus responds in real time to vary the damping force with the input current level. Thus real time damping control may achieved in response to an electric control signal.

Figure 2:
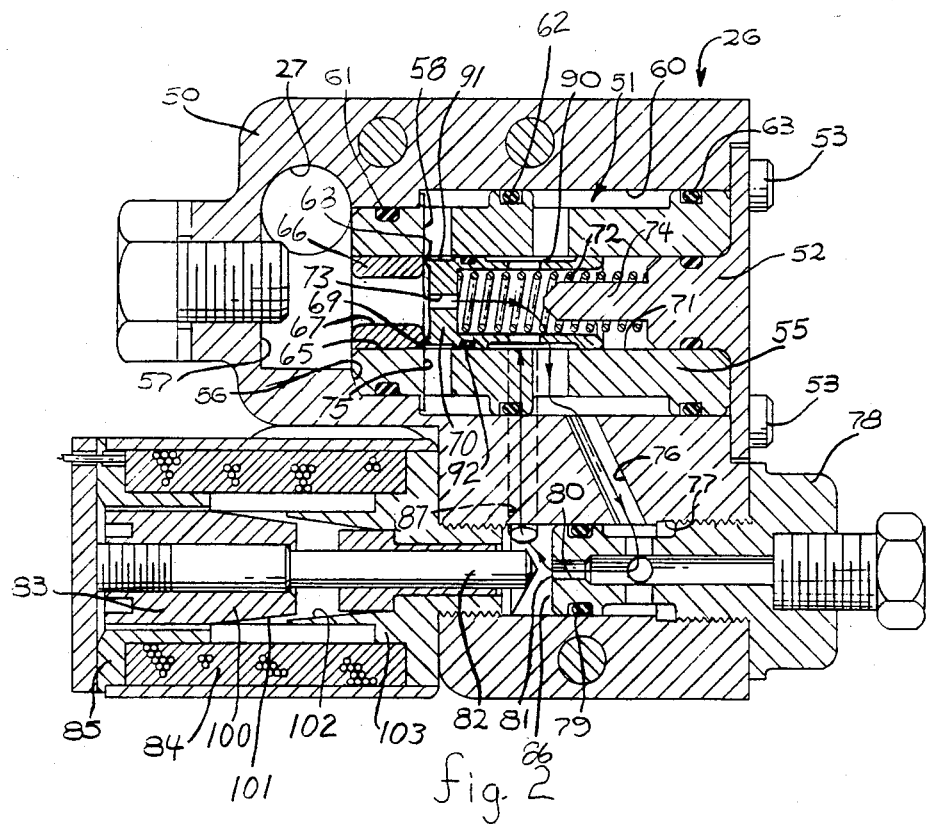
FIG. 2 is a detailed section view of an electrically controlled valve for use in the shock absorber of FIG. 1.

Electrically controlled valve 26 is shown in detail in FIG. 2. A valve housing 50 of aluminum includes an internal cavity 51 which is closed at its open right side in FIG. 2 by a cover plate 52, which may be held on with screws 53. Cover plate 52 retains, within cavity 51, a steel regulator sleeve 55, which is held against a stepped down diameter shoulder 56 of the internal surface of cavity 51. Sleeve 55 divides cavity 51 into an antechamber 57, an inlet chamber 58 and a control chamber 60. Rubber O rings help seal the chambers from each other, with O ring 61 sealing antechamber 57 from inlet chamber 58, O ring 62 sealing inlet chamber 58 from control chamber 60, and O ring 63 sealing control chamber 60 against leakage past cover plate 52. The O rings primarily prevent leakage from chamber 60 for reasons to be described later. Antechamber 57 is open to chamber 17 of shock 10 through passage 27. Sleeve 55 includes a cylindrical opening 65 between antechamber 57 and inlet chamber 58 in which is fixed a brass bushing 66 defining a horizontal inlet valve opening 67 surrounded by a face valve seat 68 within chamber 58. An inlet valve member in the form of a hollow piston 70 is horizontally reciprocable in an internal cylindrical bore 71 of sleeve 55 between a closed position as shown in FIG. 2 in which a peripheral rim 69 closingly engages face valve seat 68 and a continuous series of open positions as piston 70 moves to the right in FIG. 2. Peripheral rim 69 allows the area on the left side of piston 70 in FIG. 2 subject to the pressure of the pumping unit to substantially equal, within 5 percent, the area on the right of piston 70 in FIG. 2 subject to a control pressure within control chamber 60, while still allowing unimpeded flow past rim 69 if piston 70 moves even a thousandth of an inch to the right from its closed position. Bushing 66 is made of a comparatively soft metal such as brass so that peripheral rim 69 of steel piston 70 can form its own sealing seat as necessary in the end face of bushing 66 should the surfaces not be exactly aligned. Piston 70 is biased to the left toward the closed position by bias apparatus in the form of a spring 72 bearing against cover plate 52 and retained on a horizontally projecting finger 74 of plate 52. The spring constant of spring 72 is very small, on the order of 2 N/mm; and the length of spring 72 is considerable compared with its compression. In addition, piston 70 only moves a few thousandths of an inch in the operation of the device, as will be described, with the result that the bias of spring 72 on piston 70 is essentially constant on the order of 2-3 Newtons, independently of the position of piston 70, in the operation of the valve. Peripheral depressions 90 and 91 of piston 70 minimize the area of sliding contact with sleeve 55 to reduce sliding friction therebetween; while O ring 92 prevents leakage therebetween.

Piston 70, through its sliding contact with internal bore 71 of sleeve 55, which bore 71 comprises an opening between those chambers, closes inlet chamber 58 from control chamber 60 except for an inlet orifice 73 through the center of piston 70, which allows fluid flow therethrough from inlet chamber 58 to control chamber 60. As will be seen in the description of operation of the apparatus, the pressure drop across piston 70 due to the fluid flow through orifice 73 is essentially constant whenever fluid is so flowing; and the diameter of orifice 73 is adjusted, with respect to the bias of spring 72, so that the constant force of the spring is substantially equal and opposite that of the pressure drop of the orifice. In this embodiment, the diameter of orifice 73 is 1.3 mm.

Housing 50 further defines an outlet passage 75 from inlet chamber 58 which is open to passage 28 and thus to reservoir chamber 21. Thus, fluid may flow from chamber 17 through passage 27, antechamber 57, inlet valve opening 67, passage 75 and passage 28 to reservoir chamber 21 when the inlet valve comprising piston 70 and face valve seat 68 is open. When the inlet valve is closed, however, fluid may only flow from inlet chamber 58 through orifice 73 to control chamber 60.

Housing 50 further defines an internal passage 76 from control chamber 60 to a bore 77 closed by a regulator member 78. Regulator member 78 has an internal horizontal outlet valve opening 80, of diameter 2.0 mm in this embodiment, surrounded by a face valve seat 81. Passage 76 may be considered part of control chamber 60, with outlet valve opening 80 an outlet from control chamber 60; but face valve seat 81 is outside control chamber 60 to be closed by a valve member from outside chamber 60. A pilot valve member 82 is horizontally reciprocable between a closed position in which it closingly engages face valve seat 81 and a continous series of open positions as it moves to the left in FIG. 2 from the closed position. Pilot valve member 82 is positioned on the armature 83 of a horizontal electromechanical actuator comprising an electric coil 84 of a stator 85. The portion of bore 77 just outside outlet valve opening 80 is an outlet chamber 86 which is open by a passage 87 to passage 28 and thus to reservoir chamber 21. Fluid flow from antechamber 57 which flows through orifice 73 to control chamber 60 may thus continue through passage 76 and outlet valve opening 80, outlet chamber 86 and passages 87 and 28 to reservoir chamber 21. An O ring 79 prevents leakage of fluid from control chamber 60 through passage 76 and around the pilot valve.

In operation, an electric current through coil 84 exerts an electromagnetic force on armature 83 which varies with the current level. This force is exerted as a valve closing force in a direction to oppose the flow of fluid out of outlet opening 80. A particular input current will produce a particular electromagnetic force on armature 83 which will exert that force against the fluid flowing out of control chamber 60 and thus establish a particular pressure in control chamber 60. The force of the pressure drop due to fluid flow through orifice 73 is canceled by the bias of spring 72, and the effective exposed area on the inlet side of piston 70 is nearly equal to that on the control chamber side. Therefore, the control pressure in control chamber 60 is exerted on piston 70 against the pressure of the fluid pumped from chamber 17 through passage 27 in essentially a one-to-one correspondence. As the flow from chamber 17 increases and tries to increase the pressure on piston 70 opposing the control pressure, piston 70 opens just enough to allow sufficient fluid to flow into inlet chamber 58 and on to reservoir chamber 21 so as to prevent the back pressure exerted on chamber 17 from increasing significantly above the control pressure. As the flow from chamber 17 varies, the position of piston 70 varies over a range of about a few thousandths of an inch to maintain the control pressure on the pumped fluid. A change in current level to coil 84 produces a new control pressure in control chamber 60 and thus a new pressure in chamber 17. The pressure on pumped fluid, which defines the damping force of the shock, is thus seen to be a function only of input electric current independent of the pumping flow rate of fluid in the shock.

In the design of the valve apparatus, an important goal is maximization of the dynamic range of the device: that is, the ratio of the maximum to minimum pressures from the pumping unit that the device can handle and maintain accurate regulation. Generally, the low limit on pressure is determined by the friction of the pumping unit. There is little need to be able to control pressures lower than about 20 psi, which create forces on the order of the pumping unit frictional forces. Inlet orifice 73 needs to be small for such low pressure limit; but a small inlet orifice 73 restricts the flow necessary for operation of the pilot valve. This is the reason for the O rings described earlier; to reduce leakage of fluid from control chamber 60 and thus ensure that substantially all the fluid entering control chamber 60 through orifice 73 reaches the pilot valve. Once the lower pressure limit is decided, the dynamic range is determined by the largest pressure the device can handle, which is basically determined by the maximum force of the electrochemical actuator.

If the pilot and inlet valves were vertical, piston 70 and member 82 would be subject to high G forces due to the vertical accelerations of suspension movement which would render any accurate and stable operation of the apparatus impossible. Therefore, the valves are disposed horizontally in the apparatus to be independent of these high G forces. There are several other factors contributing to the stability of the apparatus. The electromechanical actuator is made with electromagnetic force characteristics, relative to the fluid flow characteristics of the pilot valve, such that, when the valve is operating at a particular force balance between the electromagnetic and fluid forces and there is a momentary disturbance of the position of valve member 82 or fluid flow, the electromagnetic force will vary less with the disturbance than the fluid pressure. This creates a stable condition so that any such momentary disturbance will tend to return the valve to the condition of the force balance rather than push it to its full open or closed positions. In the first embodiment of this device and tested, the electromechanical actuator was provided with essentially flat curves of force as a function of position in order to ensure that the electromagnetic force varied less with position at a given current level than the hydraulic force due to fluid pressure drop across the valve. However, there is a tradeoff in which one must give up electromagnetic force for such independence of force with position; and the lower force capability limits the dynamic range of the device as previously described. Therefore, it is preferred that the curves of force vs. position at a given current level for the electromechanical actuator be given the maximum slope permissible consistent with a guarantee that this slope will always be sufficiently flatter than that of hydraulic force with distance to ensure stability of the pilot valve.

The electromagnetic force characteristics described above are at least partly determined by the electromagnetic structure as shown in FIG. 2, wherein a pole member 100 on armature 83 has a tapered surface 101 adjacent a similarly tapered surface 102 of a stationary pole member 103, It should also be apparent, from an examination of FIG. 2, that armature 83 may move to the right with valve member 82 coming into full engagement with face valve seat 81 without pole members 100 and 103 coming into contact. This structure illustrates techniques known to those skilled in the art of magnetic circuit design for producing low absolute values of the gradient of magnetic force with respect to position at a given input coil current level. These and any other known techniques may be used to create an electromagnetic structure having the desired characteristics described above.

The inlet valve is also given stability of operation in that orifice 73, since it is through piston 70 itself rather than in the valve housing around piston 70, acts as a damper to damp horizontal oscillatory movement of piston 70. Thus the sliding friction of piston 70 within sleeve 55 may be reduced, as previously described, for more accurate operation, since such friction is not needed as greatly for damping. Face valves are used for both the inlet and pilot valve for minimum friction at the lower pressures of 50–100 psi obtained with large passages in a valve body outside the shock tube. The lower pressures produce less leakage for more accurate operation and less wear on less costly components.

The embodiments of the invention in which an exclusive property or privilege is claimed are defined as follows:

1. A shock absorber apparatus for a motor vehicle comprising shock members attached to sprung and unsprung masses of the motor vehicle, the shock members being relatively vertically movable and comprising pumping chambers containing an incompressible fluid, a piston movable to vary the volume of the pumping chambers and thereby pump the incompressible fluid with relative movement of the shock members, check valve apparatus effective to direct the pumped incompressible fluid in a single direction through a passage to a reservoir chamber regardless of direction of movement of the shock members, and an electrically controlled valve apparatus controlling flow through the passage and comprising, in combination:

a valve housing fixed externally to one of the shock members, the valve housing defining an inlet chamber and a control chamber, a horizontal inlet valve opening to the inlet chamber from the pumping chambers with a surrounding face valve seat within the inlet chamber, a horizontal outlet valve opening from the control chamber to the reservoir chamber with a surrounding face valve seat outside the control chamber, an outlet from the inlet chamber open to the reservoir chamber, and an opening from the inlet chamber to the control chamber;

an inlet valve member with an inlet orifice therethrough in the inlet chamber horizontally reciprocable between closed and open positions with respect to the face valve seat of the inlet valve opening but closing the opening from the inlet chamber to the control chamber except for the inlet orifice, the inlet valve member being biased toward its closed position by bias apparatus providing an essentially constant bias independent of the position of the inlet valve member, the inlet orifice providing fluid flow into the control chamber with relative movement of the shock members regardless of the position of the inlet valve member and a resulting pressure drop across the inlet valve member with the fluid flow therethrough effective to substantially cancel the bias of the bias apparatus so that opening of the inlet valve is controlled by the pressure in the control chamber, the orifice further providing damping for the inlet valve member; and a pilot valve member outside the control chamber horizontally reciprocable between closed and open positions with respect to the face valve seat of the outlet valve opening, the pilot valve member being activated by an electromechanical actuator providing a valve closing force with an electric input current which opposes the hydraulic force of fluid flow out of the control chamber, the valve closing force due to any given electric input current varying less with variations in opening displacement or fluid flow therethrough than corresponding variations in the hydraulic force due to the fluid flow pressure drop across the outlet valve opening so as to produce stable pilot valve member operation with a fluid pressure within the control chamber as a function of electric input current, whereby the damping force of the shock absorber is controlled by the fluid pressure in the control chamber and therefore by the electric input current independently of fluid flow from the shock members.

* * * * *